United States Patent [19]

Beach

[11] Patent Number: 4,827,567

[45] Date of Patent: May 9, 1989

[54] REMOVABLE ENCLOSURE HANDLE AND HANDLE RECEIVER ASSEMBLY

[75] Inventor: Robert E. Beach, Kirkland, Wash.

[73] Assignee: The Boeing Company, Seattle, Wash.

[21] Appl. No.: 226,607

[22] Filed: Aug. 1, 1988

Related U.S. Application Data

[63] Continuation of Ser. No. 913,506, Sep. 29, 1986, abandoned.

[51] Int. Cl.⁴ .................................................. B25G 3/24
[52] U.S. Cl. ............................. 16/114 R; 16/DIG. 24; 16/DIG. 40
[58] Field of Search ...................... 16/114 R, 119, 124, 16/125, DIG. 5, DIG. 24, DIG. 40, DIG. 41; 220/94 R; 190/39, 115, 116, 117

[56] References Cited

U.S. PATENT DOCUMENTS

| | | | |
|---|---|---|---|
| 1,035,483 | 8/1912 | Scott | 16/114 R |
| 2,239,798 | 6/1939 | Tinnerman | 16/114 R |
| 2,537,750 | 1/1951 | Gretschel | . |
| 2,621,357 | 12/1952 | Stuman | 16/114 R |
| 4,064,594 | 12/1977 | Teti, Jr. et al. | 16/125 |
| 4,404,709 | 9/1983 | Janz et al. | 16/111 R |

FOREIGN PATENT DOCUMENTS 1098399 1/1961 Fed. Rep. of Germany .

Primary Examiner—Fred Silverberg
Attorney, Agent, or Firm—Seed and Berry

[57] ABSTRACT

A removable handle and handle-receiving assembly. A handle having a first end connected to a plurality of annular segments is inserted into a first opening, twisted to a predetermined position and its second end inserted into the front panel, the second end being retained by a sliding retainer. The removable handle replaces all semipermanently mounted handles on instrumentation closures, resulting in considerable weight and cost savings.

1 Claim, 3 Drawing Sheets

REMOVABLE ENCLOSURE HANDLE AND HANDLE RECEIVER ASSEMBLY

STATEMENT OF GOVERNMENT INTEREST

The U.S. Government has rights in this invention.

CROSS REFERENCE TO RELATED APPLICATION

This application is a continuation of U.S. patent application Ser. No. 913,506, filed Sept. 29, 1986, now abandoned.

TECHNICAL FIELD

The present invention relates to a removable handle for use with equipment enclosures, and more particularly, to a removabale handle and handle-receiving assembly which engage by a twisting motion of the handle and are secured by a detent-engaging slide.

BACKGROUND ART

It is common practice to organize instrumentation into enclosure racks, the enclosures being vertically stacked. The equipment enclosures are typically approximately nineteen inches wide and six or more inches high. They are secured in the racks unless it is necessary to remove one for purposes of repair or replacement.

It has been known in the prior art to provide these equipment enclosures with two handles in the event that it becomes necessary to remove an enclosure from its rack. The size and placement of these handles are the subjects of a military standard when used with equipment supplied to governmental agencies.

In applications where weight is critical, these handles represent weight that can be removed. In addition, producing enclosures without handles represents a cost savings. Accordingly, it is desirable to provide a removvble handle that must be attached to the equipment enclosures only when one is to be removed from its rack.

As disclosed in German Pat. No. 1,098,399, a removable handle can be produced with spring-loaded fittings designed to engage mating fittings attached to the enclosures. The handles are placed over the enclosure fitting, a force directed toward the equipment is applied to the handle to overcome the springs, and the handles are slid to a more secure position and released. A problem with handles such as this, which engage with a sliding motion, is that any shaking force or other sudden motion may allow the handles to slide off the enclosure, permitting the equipment to fall to the floor. It is clearly undesirable to chance the inadvertent destruction of a piece of equipment in this way.

U.S. Pat. No. 2,537,750, to Gretschel, discloses a removable handle that can be attached to or detached from a suitcase by a sequence of twisting and locking operations. Weight-supporting tongues are attached to both ends of the removvble handle. After the first end is attached, the handle must be twisted ninety degrees before the second end can be attached. Because these tongues are intended to be forced into a narrow slot on the suitcase, the load bearing surfaces of the tongues are extremely small, resulting in substantial pressure at these points and potential failure of the removable handle mechanism. In addition, because the two ends of the handle disclosed in Gretschel are identical, and because it is important to attach the ends of the handle in a particular order, a person using Gretschel's handle can experience difficulty in attaching it to the suitcase. It is therefore desirable to have removable handles that are placed in position by a twisting motion and subsequent locking operation while being able to support heavy loads.

DISCLOSURE OF THE INVENTION

It is an object of the present invention to provide a removable handle and handle-receiving assembly in order to reduce equipment weight and save costs.

It is another object of the present invention to provide removable handles having broad support areas capable of sustaining heavy equipment loads.

It is yet another object of the present invention to provide a removable handle and handle receiver assembly that can be retrofitted to already existing equipment and enclosures.

In general, the removable handle and handle receiver assembly of the present invention is intended to be used in connectin with a planar panel of an enclosure, the handle being securable in a predetermined orientation with respect to the planar panel. The handle has two legs lying in the same plane. Tangents to the ends of the legs are parallel in this plane. The legs are separated by a predetermined distance. A first leg of the handle is fixedly attached to a flat keyway tab having a predetermined shape, the tab being perpendicular to the tangents to the end of the first arm, and the second arm of the handle having a detent retaining means. The handle-receiving assembly comprises a first opening formed in the planar panel of the enclosure, the first opening being complementary to the shape of the flat keywy tab. The shape is rotated to an insertion orientation with respect to the orientation of the flat keyway tab on the handle. When the handle is in the predetermined orientaion, the rotation is about an axis perpendicular to the planar panel. The handle-receiving assembly further comprises a second opening in the planar panel adapted to receive a second arm of the handle when the handle is in the predetermined orientation, and a fixture for removably engaging the detent retaining means of the second leg of the handle when the second leg is inserted in the second opening.

In a specific embodiment of the invention, the removable handle and handle-receiving assembly can further comprise means requiring that the handle be rotated from the insertion orientation to the predetermined orientation before the second leg of the handle can be inserted into the second opening of the handle-receiving assembly. The first and second legs of the handle can have circular cross sections. The fixtures for removvbly engaging the detent retaining means can comprise a fork-shaped planar slider having two coplanar legs, the slider being slidable between engaged and open positions and the sliding movement being restrained to be parallel to the surface of the planar panel. The two slider legs engage the detent retaining means in the engaged position to secure the second leg of the handle from moving perpendicularly to the planar panel and the two legs disengaging the detent retaining means when the slider is in the second position.

BEST MODE FOR CARRYING OUT THE INVENTION

Figure 1:
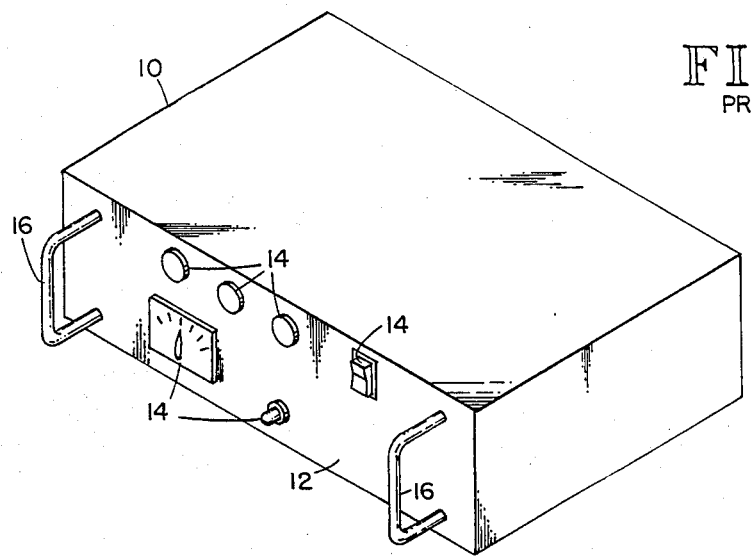
FIG. 1 is a perspective drawing of an equipment enclosure known in the prior art.

Referring now to FIG. 1, an equipment enclosure known to the prior art can be seen to consist of a rectangularly shaped equipment enclosure 10 having a front panel 12 through which access of various buttons, knobs, switches, and meters 14 may be gained. At either end of the front panel, handles 16 semipermanently attach to the front panel by means of backing screws threaded into the handle. The handles are available for grasping in order to remove and place in the enclosure.

Figure 2:
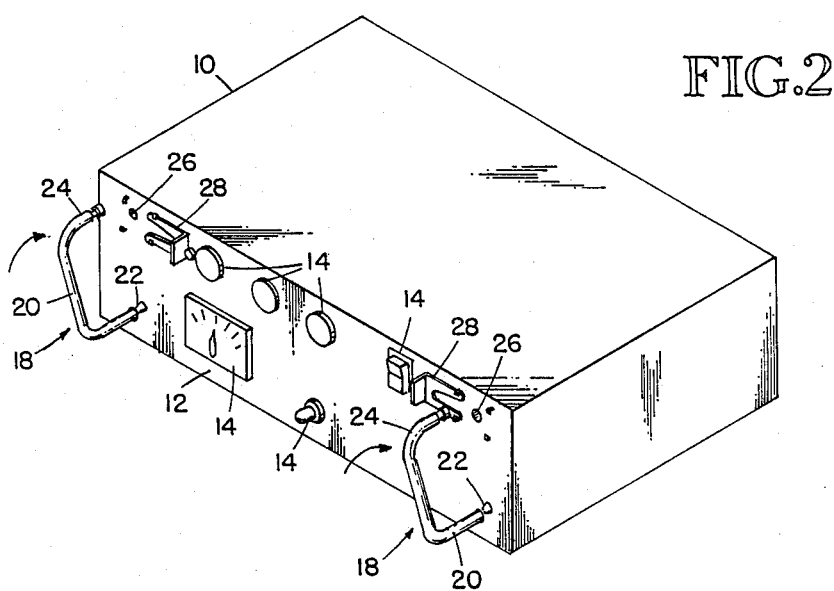
FIG. 2 is a perspective drawing of a piece of equipment having removable handles and the handle-receiving assembly of the present invention.

FIG. 2 shows the enclosure of FIG. 1 where semipermanently attached handles 16 have been replaced by two removable handle and handle receiver assemblies 18 of the present invention. These assemblies comprise the U-shaped handle 20 whose first end is inserted into a shaped opening 22 followed by a clockwise rotation of a handle to a vertical orientation similar to that shown in FIG. 1. In this vertical position, the second end 24 can be inserted into second opening 26 and held in position by slider 28.

Figure 3A:
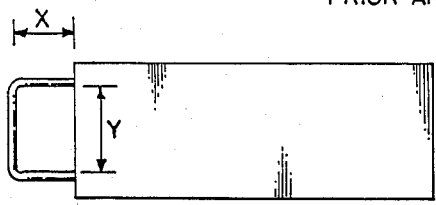
FIGS. 3A and 3B are front and side views of handle assemblies known in the prior art.
Figure 3B:
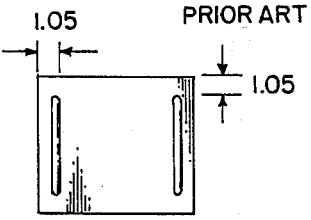

The handles known in the prior art are subject to Military Standard 1472C, dated May 2, 1981. According to this standard, equipment subject to frequent removal and replacement must be supplied with either one handle and one grasp area or two handles. Any equipment weighing less than ten pounds is not required to have a handle. As shown in the table below, Military Standard 1472C provides for grasping by bare, gloved, and mittened hands. While the spacing of the handles horizontally from the two outer edges of the equipment enclosure are specified to be 1.05 inches and the vertical spacing of the upper edge of a handle is 1.05 inches below the upper edge of the equipment enclosure, the stand-off height (X) and separation between the legs (Y) are specified by the standard as given in the table below. These dimensions are also shown in FIGS. 3A and 3B.

|  | X (in inches) | Y (in inches) |
| --- | --- | --- |
| Bare Hands | 1.875 inches | 4.375 inches |
| Gloved Hands | 2.00 inches | 5.00 inches |
| Mittened Hands | 3.00 inches | 5.25 inches |

Figure 4:
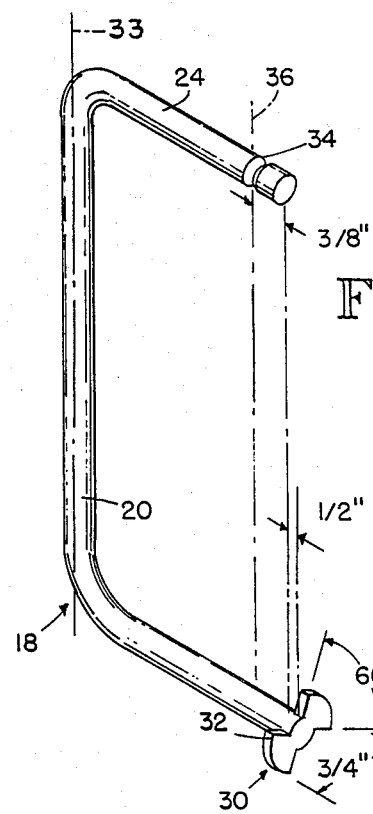
FIG. 4 is an isometric view of the handle of the present invention.

FIG. 4 presents an isometric view of the removable handle of the present invention. The handle can be a U-shaped handle made from an integral length of bendable rod, e.g., quarter-inch diameter circular cross section rod made from aluminum, magnesium, or titanium. The rods may also be formed from a composite material. Those skilled in the art will appreciate that the scope of the invention is not limited by the shape of the handle, the only requirement of the handle being that the end of the first leg should be parallel to the end of the second leg. A keyway tab 30 is fixedly attached to the end of the first leg. The tab is made from a flat material attached perpendicularly to the end of the first leg and having a characteristic shape described as a plurality of angular sectors 32. As shown in FIG. 4, each of these angular sectors subtends an angle of 60 degrees and no axis of symmetry of the plurality of angular sectors need have any particular orientation to the direction of the long axis 33 of the handle. The diameter of the smallest circle which circumscribes the keyway tab is approximately ¾ of an inch. As will be seen subsequently, the keyway tab and a portion of the lower leg are inserted perpendicularly to the planar panel of the equipment enclosure according to the pattern of the keyway tab, and, following entry, the handle is then twisted so that its long axis 33 stands vertical.

Detent surface 34 is formed in the second leg, relatively close to its end. Typical spacing between the end of the second leg and the location of the detent surface is ⅜ of an inch. Broken line 36 represents the front surface of the enclosure when the handle has been inserted and is ready to be secured by the slider. While FIG. 4 shows the detent surface to be circumferential, the detent surface can be any configuration that allows this detent retaining means to perform its function. FIG. 4 shows that the first leg projects further into the enclosure than does the second leg. In fact, because the distance between the face of the keyway tab and the location of the surface when the handle is installed is ⅛ inch, the first leg is longer than the second leg by the thickness of the material used to made the keyway tab. This configuration allows keyway tab 32 to be inserted into an opening in the planar panel and the handle twisted to the vertical position.

Figure 5:
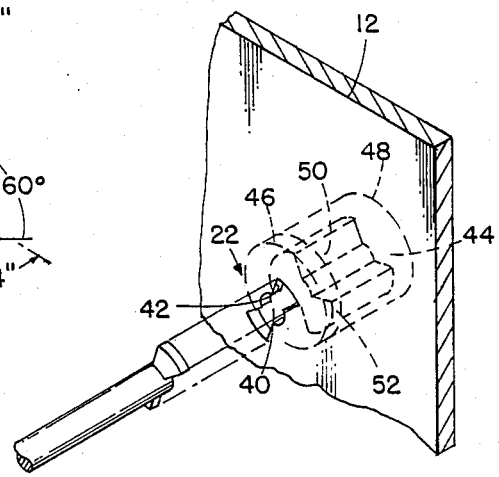
FIG. 5 is an isometric close-up view of the first opening of the handle-receiving assembly of the present invention.

FIG. 5 is an isometric view of the first opening 22 in the front panel of the enclosure. The opening consists of an inner circular portion 40 with two diametrically opposed annular segments 42. Each of the annular segments can subtend an angle of, for example, 60 degrees. Immediately behind planar panel 12 is a block of material 44, having a outwardly directed surface 46 and an inwardly directed surface 48. Block 44 is generally cylindrical in shape and its outwardly directed surface is spaced away from the inner surface of front panel 12 by an amount at least equal in thickness to the thickness of keyway tab 32. The outwardly directed surface is surrounded by a shortened cylindrical ridge 52 extending outwardly from the material block. The block is attached to the inner surface of the planar panel by welding, epoxy gluing, or other appropriate methods. This spacing-away allows the handle to be rotated after the keyway has been inserted beyond the first opening 22 toward the block 44. As indicated, the block located behind first opening 22 contains an internal cavity 50 whose cross sections are identical in shape to the first opening, but rotated by 60 degrees. Accordingly, therefore, a handle whose keyway has been inserted through opening 22 and then rotated clockwise by 60 degrees can be inserted further, with the keyway extending into cavity 50. By appropriate design, the second leg of the handle will then be precisely lined up with the second opening in the front panel and, therefore, ready to be secured in position. If the internal cavity of block 44 is given a depth of approximately ⅜ of an inch, the keyway will bottom out against the back surface of the cavity just as the detent surface (see FIG. 4) aligns with the outer surface of the front panel.

Figure 6A:
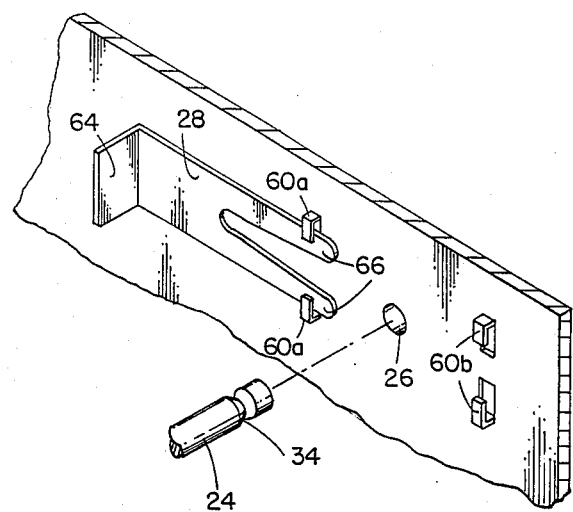
FIGS. 6A and 6B are isometric views of the second opening and the detent retaining means in the cabinet enclosure.
Figure 6:
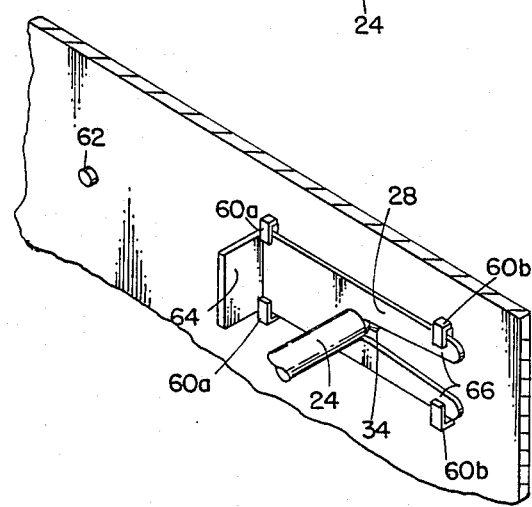

FIGS. 6A and 6B are isometric views of the second opening 26 and the detent retaining slider 28, showing the slide in its open and closed positions, respectively.

The slider is retained against the front panel by a series of tabs 60a and 60b which rise above the surface of the front panel. These tabs ride against the outward surface of the slider to capture it against the outward surface of the front panel. FIG. 6A shows that the slider is prevented from disengaging from tabs 60a by means of a protuberance, such as a rivet 62. In assembling the sliding retainer device, the slider is inserted under at least the first pair of tabs 60a and the rivet is then installed. To lock the slider against the second leg of the handle, force is applied against upstanding end 64 (toward the right in FIG. 6B) until the two legs 66 capture the detent surface 34.

While an externally mounted slider retainer has been described above, it will be apparent to those skilled in the art that various other detent retainers, such as an internally mounted slider retainer, can be produced.

One particular advantage of the removable handle and handle-receiving assembly of the present invention is that this device can be retrofitted to instrumentation enclosures. The retrofitting can be accomplished by removing the semipermanent handles from the front panel of the instrumentation enclosure, modifying the lower hole in the front panel to have a form matching the keyway tab that is to be used with this equipment, attaching a cylindrical keyway-matched block behind the first opening, and punching the upper portion of the front panel to create retaining tabs 60a and 60b. These modifications will be minimally intrusive to the interior volume of the enclosure and will represent an overall savings in weight of the equipment.

While varius modifications of the present invention can be made by one skilled in the art, the spirit and scope of the present invention is limited only by the following claims.

I claim:

1. A removable handle assembly for and in combination with a planar panel of an enclosure, comprising:

a handle that is removably securable in a predetermined orientation with respect to the planar panel, the handle being made from an integral circular cross-section rod bent to a U-shape having two legs, each leg having an end, the legs being substantially parallel at their ends and separated by a predetermined distance, one leg of the handle being fixedly attached perpendicularly to a substantially flat contact surface of a flat keyway tab having a predetermined shape and the other leg of the handle having a detent retaining means, the flat keyway tab having the shape of a circle of a first diameter concentrically surrounded by a plurality of uniformly spaced annular sectors of uniform size and of a second diameter, the second diameter being greater than the first diameter; and handle-receiving means comprising:

a first opening formed in the planar panel of the enclosure, the first opening being complementary in shape to the shape of the substantially flat contact surface of the keyway tab fixedly attached to the one end of the handle and being rotated about an axis perpendicular to the planar panel to an insertion orientation with respect to the orientation of the keyway tab on the handle when the handle is in the predetermined orientation, means requiring that the handle after the tab has been inserted into the first opening be rotated about the axis from the insertion orientation to the predetermined orientation before the other leg of the handle can be received by a second opening;

the second opening in the planar panel adapted to receive the other leg of the handle when the handle is in the predetermined orientation, the second opening being the predetermined distance from the first opening; and a fixture for removably engaging the detent retaining means of the other leg of the handle when the other leg of the handle is inserted in the second opening the fixture comprising a fork-shaped planar slider having two coplanar legs and an upstanding end, wherein the end extends outwardly at an angle to the coplanar legs, the slider being slidable between engaged and open positions, the sliding movement being restrained to be parallel to the surface of the planar panel while being substantially rectilinear, the two coplanar legs engaging the detent retaining means when the slider is in the engaged position to secure the second end of the handle from moving perpendicularly to the planar panel, and the two coplanar legs disengaging the detent retaining means when the slider is in the open position, the fixture being slidably secured to the planar panel on one side of the planar panel which is the same side of the planar panel as is substantially the entire handle, the slider being slidably retained against the panel by a series of spaced raised tabs, the raised tabs engaging the coplanar legs along the edges of the coplanar legs, and the slider being prevented from becoming disengaged from the raised tabs by means of a protuberance secured to the one side and spaced from the raised tabs.

* * * * *